US006366434B2

(12) United States Patent
Magnussen

(10) Patent No.: US 6,366,434 B2
(45) Date of Patent: Apr. 2, 2002

(54) APPARATUS FOR SAFELY DISCONNECTING AN ELECTRICAL LOAD FROM AN ELECTRICAL DC VOLTAGE SUPPLY

(75) Inventor: Björn Magnussen, Berkeley, CA (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/725,341

(22) Filed: Nov. 29, 2000

Related U.S. Application Data

(63) Continuation of application No. PCT/DE99/01480, filed on May 17, 1999.

(30) Foreign Application Priority Data

May 29, 1998 (DE) .................................... 298 09 550 U

(51) Int. Cl.7 ................................................ H02H 3/16
(52) U.S. Cl. ......................................... 361/55; 361/166
(58) Field of Search ............................. 361/55, 94, 48, 361/166, 167, 103, 104, 93.3, 31, 33; 307/112, 113, 114, 15, 116

(56) References Cited

U.S. PATENT DOCUMENTS

| | | | | | |
|---|---|---|---|---|---|
| 3,601,807 | A | * | 8/1971 | Beausoleil | 340/825.9 |
| 3,766,435 | A | * | 10/1973 | Childers | 361/42 |
| 4,075,678 | A | * | 2/1978 | Levinn | 361/104 |
| 4,351,014 | A | * | 9/1982 | Schofield, Jr. | 361/100 |
| 4,412,267 | A | * | 10/1983 | Hansen | 361/94 |
| 4,707,759 | A | * | 11/1987 | Bodkin | 361/48 |
| 4,710,841 | A | * | 12/1987 | Bottrell | 361/23 |
| 4,752,851 | A | * | 6/1988 | Ritter | 361/31 |
| 5,341,265 | A | * | 8/1994 | Westrom et al. | 361/44 |
| 5,536,980 | A | * | 7/1996 | Kawate et al. | 307/116 |
| 5,689,398 | A | * | 11/1997 | Miller et al. | 361/189 |
| 5,828,140 | A | * | 10/1998 | Shih | 307/18 |
| 5,894,392 | A | * | 4/1999 | McDonald | 361/42 |

* cited by examiner

*Primary Examiner*—Kim Huynh
(74) *Attorney, Agent, or Firm*—Herbert L. Lerner; Laurence A. Greenberg; Werner H. Stemer

(57) ABSTRACT

An apparatus for disconnecting an electrical load from an input DC voltage includes first and second lines which carry the input DC voltage to the electrical load. A fuse is connected in series in the first line. The switching contact of a first relay is connected in series in the first line and is opened for a disconnection process. The switching contact of a second relay is connected in parallel between the first and the second line downstream of the first relay and, when a disconnection process takes place, is closed once the first relay has been opened. The apparatus has a high availability despite the use of commercially available relays.

6 Claims, 1 Drawing Sheet

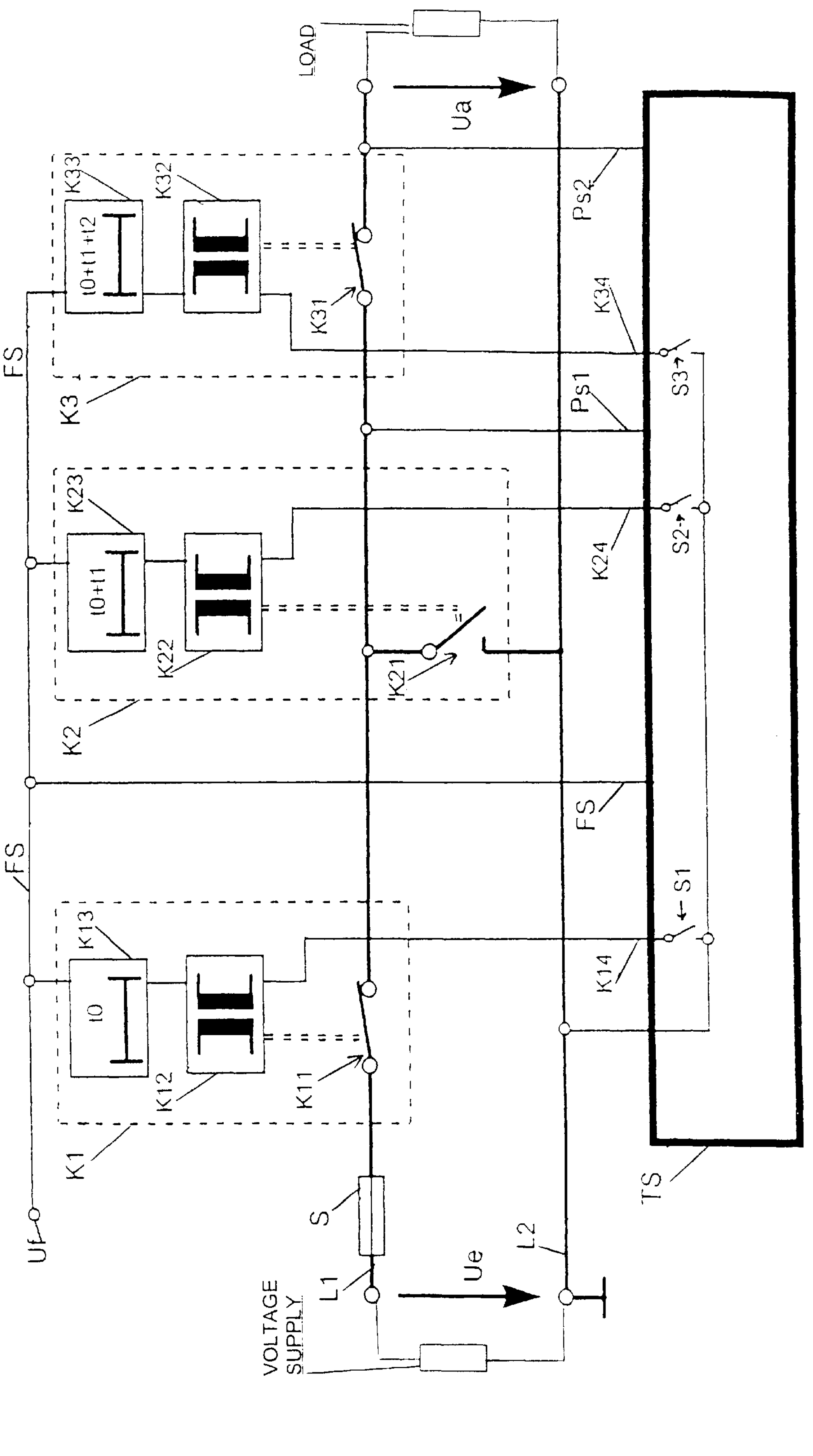
LOAD
Ua
K33
t0+t1+t2
K32
K31
K3
FS
Ps2
K34
S3
Ps1
K23
t0+t1
K22
K21
K2
K24
S2
FS
S1
K13
t0
K12
K11
K1
K14
TS
S
Uf
L1
L2
Ue
VOLTAGE
SUPPLY

APPARATUS FOR SAFELY DISCONNECTING AN ELECTRICAL LOAD FROM AN ELECTRICAL DC VOLTAGE SUPPLY

CROSS-REFERENCE TO RELATED APPLICATION

This application is a continuation of copending International Application No. PCT/DE99/01480, filed May 17, 1999, which designated the United States.

BACKGROUND OF THE INVENTION

Field of the Invention

The invention relates to an apparatus used for a safety disconnection of an electrical load from an electrical power supply, for example a feed battery. The load may be an electrical load such as an electric motor with a high inductance. Safety disconnections or emergency disconnections are necessary when the electrical load must be forced to stop operating, for example when a fault occurs. Such safety disconnections serve, for example, to protect personnel against undesirable, uncontrolled and in some circumstances even dangerous actions of, for example, an electric motor load. Since relays are generally used for an emergency disconnection, these relays must operate in a fail-safe manner.

In the past, special safety relays have been used for safely disconnecting electrical loads. These safety relays have several parallel contact sets, which are driven in a mechanically forced manner. While one of the contact sets is used to pass on or interrupt the actual load current, the other contact set may have a test current applied to it. This test current can be evaluated to determine whether the contact sets, which are driven in a forced manner, have assumed a desired or undesired switching state, that is to say whether the safety relay is operating correctly or whether it is defective. However, this type of mechanical checking of relays with the aid of redundant contacts is complex.

SUMMARY OF THE INVENTION

It is accordingly an object of the invention to provide an apparatus for disconnecting an electrical load from a supply voltage which overcomes the above-mentioned disadvantages of the heretofore-known apparatuses of this general type and which does not require the use of special safety relays.

With the foregoing and other objects in view there is provided, in accordance with the invention, an apparatus for disconnecting an electrical load from an input DC voltage of a DC voltage supply, including:

a first line carrying a given potential;

a second line carrying a reference potential;

the first line having an input connection to be connected to the DC voltage supply and having an output connection to be connected to the electrical load;

the first and second lines carrying the input DC voltage from the input connection to the output connection;

a fuse connected in series in the first line and being provided adjacent to the input connection, the fuse having a side opposite the input connection;

a first relay having a first switching contact and having a side opposite the input connection;

the first switching contact being connected in series in the first line on the side of the fuse opposite the input connection, the first switching contact being closed during a normal operation, and the first switching contact being opened for disconnecting the first line when a disconnection is initiated;

a second relay having a second switching contact; and the second switching contact being connected in parallel between the first line and the second line on the side of the first switching contact opposite the input connection, the second switching contact being open during the normal operation, and being closed when the disconnection is initiated for short-circuiting the first line to the second line subsequent to the first switching contact being opened.

In other words, the circuit according to the invention is based on the safety of the disconnection process being achieved with the aid of a so-called "checked redundancy" of staggered conventional relays. The configuration of the disconnection apparatus according to the invention has the particular advantage that a safe disconnection is achieved on the principle of the checked redundancy and diversity. In this way, it is possible to dispense with the use of special safety relays. Instead of using special safety relays, simple relays, for example mass-produced relays from a large-scale production for motor vehicles, can be used for the relays K1, K2, K3 which each have only one set of switching contacts. The invention has the advantage that a safety disconnection apparatus can be constructed using low-cost relays which, until now, could not be used in conventional safety circuits.

In accordance with another feature of the invention, a third relay having a third switching contact is provided. The third switching contact is connected in series in the first line on a side of the second switching contact opposite the input connection. The third switching contact is closed during the normal operation, and is opened when the disconnection is initiated for disconnecting the first line after the second switching contact is closed.

In accordance with yet another feature of the invention, the first, second, and third relays are commercially available relays, which have a single contact set.

In accordance with a further feature of the invention, the second line is a ground potential line.

In accordance with another feature of the invention, the first and second relays perform a high-availability disconnection.

Other features which are considered as characteristic for the invention are set forth in the appended claims.

Although the invention is illustrated and described herein as embodied in an apparatus for a safe disconnection of an electrical load from an electrical DC voltage supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE is a schematic circuit diagram of an apparatus according to the invention for disconnecting an electrical load from a voltage supply.

DESCRIPTION OF THE PREFERRED EMBODIMENTS

Referring now to the single FIGURE of the drawing in detail, there is shown, by way of example, a circuit diagram of a disconnection apparatus constructed according to the invention. The disconnection apparatus is connected between an electrical power supply and an electrical load. The electrical load may be, for example, in the form of a motor and may be a component of an appliance. In this case, on the left-hand side of the figure, the electrical power supply provides a supply input DC voltage Ue, while on the right-hand side of the figure the electrical load is supplied with an input voltage Ua. When the disconnection apparatus is operating in a normal mode, without any faults, the input DC voltage Ue is passed on unchanged via the lines L1, L2 to the connection point of the electrical load. The input voltage or terminal voltage Ua of the electrical load is then identical to the input DC voltage Ue. In the example in the figure, the line L1 thus carries the voltage potential of the input DC voltage Ue to the point of the input voltage or terminal voltage Ua, while the line L2 carries a reference potential, for example the ground potential.

The disconnection apparatus according to the invention contains a first relay K1 on the side of the electrical power supply. Its switching contact K11 is connected into the line L1 at a location right after where the input DC voltage Ue is supplied to the line L1, and the switching contact K11 is closed during normal operation. Furthermore, a fuse S is connected in the line L1 between the feed point for the input DC voltage Ue and the switching contact K11. In the direction toward the connected electrical load, the first relay K1 is followed by a second relay K2. Its switching contact K21 is connected between the lines L1, L2, and is open during normal operation.

According to a further embodiment of the invention which is illustrated in the figure, the second relay K2 may also be followed by a third relay K3. Its switching contact K31 is then likewise connected in series with the switching contact K11 in the line L1, and is closed during normal operation. Finally, the voltage potential for the input voltage Ua of the electrical load is supplied on the output side of the switching contact K31.

The relays K1, K2 and, possibly, K3 each have a field winding or excitation winding K12, K22 and, possibly, K32. If a control voltage Uf provided by an enable signal line FS drops across them, then the relays are activated and their switching contacts K11, K21 and, possibly, K31 assume the switch positions explained above. The relays K1, K3 may thus be regarded as "make contacts" or "normally-on contacts" and the relay K2 as a "break contact" or "normally-closed contact." In this normal operation, the input DC voltage Ue is available without restriction as the input voltage Ua for the electrical load without being influenced by the disconnection apparatus.

A disconnection process for the electrical load, that is to say disconnection of the input voltage or terminal voltage Ua for the load from the input DC voltage Ue of the electrical power supply, is initiated in the example illustrated in the figure by a drop in the control voltage Uf on the enable signal line FS. This signals the occurrence of a fault, for example in the interior of an appliance containing the electrical load, which necessitates a forced disconnection of the electrical load. The identification that the fault has occurred and the interruption in the control voltage Uf which results from this can be brought about, for example, by appropriately incorporated switching devices or detectors in the interior of the electrical appliance which contains the electrical load. To assist clarity, such elements are not shown in the example in the figure. The drop in the control voltage Uf or the cessation of the control voltage Uf results in a drop in the field voltages to the field windings K12, K22 and, possibly K32 of the relays K1, K2 and, possibly, K3, so that, at the end of the disconnection process, the relays assume the switching states that are complementary to those of the basic circuit diagram shown in the figure.

The method of operation of the disconnection apparatus according to the invention is based on the concept that the relays K1, K2 and, if provided, the relay K3 as well, change successively to the respective complementary switching state during a disconnection process. Thus, in the example in the figure, the relay K1 opens the switching contact K11 first of all. Relay K2 then closes the switching contact K21. If the relay K3 is additionally provided, then, finally, this relay also opens the switching contact K31.

In order to achieve this activation sequence, the relays K1, K2 and, possibly, K3 may, as shown in the schematic circuit diagram in the figure, have upstream-connected delay elements K13, K23 and, possibly, K33, which each have an increasing delay time. In the example in the figure, the delay element K13 of the relay K1 has the delay time t0, the delay element K23 of the relay K2 has the delay time t0+t1, and the delay element K33 of any relay K3 which may also be present has the delay time t0+t1 +t3. These stepped delay times result in the relays being tripped in the sequence K1, K2, K3.

In practice, it has been found that it is even possible to manage without any discrete delay elements K13, K23 and nevertheless to achieve the desired successive tripping of the relays starting with K1, followed by K2 and onto K3. This is due to the fact that the component-specific natural switching delay of a "break contact", that is to say of the relay K1, may be shorter than the natural switching delay of a "make contact", that is to say of the relay K2. With suitable component selection for K1, K2, relay K2 thus switches after the relay K1 without any additional measures being required. Only if a third additional relay K3 is present, then there is in some circumstances a need to provide a discrete, additional delay element. This may, for example, be in the form of a freewheeling diode connected in the reverse direction to the control voltage Uf and in parallel with the field winding K32.

A disconnection delay for the relays K1, K2, K3 may advantageously be implemented passively in a simple way. The supply of the control voltage Uf on the enable signal line FS is then produced via a high-voltage-resistant diode. A failure of one of the diodes in the interruption direction leads to disconnection of the electrical load; while a failure of one of the diodes in the short-circuit direction cancels the effect of the delay, but does not endanger disconnection of the electrical load. Each relay K1, K2, K3 is provided with its own freewheeling diode.

A resistor is advantageously also connected in series with the freewheeling diodes. If this resistor is small, then the coil current still continues to flow for some time owing to the residual magnetic field. If the resistor is larger, then this current flow decays more quickly and the relay trips more quickly. The selection of the resistors may also take account of the different rates at which the mechanics of the relays operate. Another possible way to delay the disconnection time is to use capacitors.

The sequence of a disconnection process with the aid of the disconnection apparatus according to the invention will now be explained in detail.

After a drop in the control voltage Uf, the relay K1 is the first to react, once a delay time t0 has elapsed. The make contact K11 opens and interrupts the current supply to the load to be disconnected on the side of the supplying input DC voltage Ue. The second to react is the relay K2, after a delay time t0+t1. The break contact K21 closes and thus shorts the input DC voltage Ue. Should the relay K1 not have disconnected correctly before this, then the fuse S now blows and interrupts the input DC voltage Ue. If a third relay K3 is provided in order to increase further the disconnection safety, then this reacts after a delay time of t0+t1+t2 has elapsed. Its make contact K31 opens and thus interrupts the current flow on the side of the load to be disconnected.

According to a further embodiment, the disconnection apparatus according to the invention may have an additional test circuit TS. This is supplied with the control voltage Uf via the enable signal line FS. Initiation of the disconnection state may be confirmed by the test circuit TS by evaluation of the enable signal line FS. The test circuit then opens additional contacts S1, S2, S3, which are provided in connecting lines K14, K24, K34 between the field windings K12, K22, K32 and ground potential on the line L2. This prevents accidental reconnection of the relays K1, K2 and, if applicable, K3.

The circuit according to the invention is particularly suitable for safe disconnection of electrical loads which have high inductance. One example is a DC motor which is supplied with a current from a battery, for example a lead-acid accumulator, with a rated voltage of 24 V. One problem with forced disconnection of such loads is that, in certain fault situations, very high currents may be briefly caused by the electrical load, and these must be safely interrupted by the disconnection apparatus. Thus, for example, a DC motor may draw a very high current owing to a burnt-out power output stage. The maximum motor acceleration which occurs in this case represents an extremely hazardous operating state. In this case, the motor must be positively stopped by the disconnection apparatus, which needs to respond in a fail-safe manner under all circumstances. A mechanical blockage of the motor may also result in a very high current due to overloading of the power output stages. Finally, for example, a short-circuit within the full bridges of the power output stage of final stage of a DC motor may also cause a high current which must be disconnected.

At the start of a disconnection process, the relay K1 first of all carries out a normal disconnection process, which must result in the entire load current being disconnected. If an extreme peak load current value occurs at this moment, then this can lead to the relay K1 being damaged. However, in practice it has been found that the relay K1 generally assumes the disconnected state despite any damage.

Only in rare exceptional cases can the relay K1 “stick”, that is to say remain closed, owing to the damage, causing the desired disconnection process to fail. Mechanical jamming of the relay K1 also cannot be completely excluded. If the relay K1 fails, safe disconnection is now carried out by the further relay K2. This short-circuits the input DC voltage Ue and thus blows the fuse S. Since this process takes place only after failure of the relay K1, blowing of the fuse S signals a malfunction of K1, so that both the fuse S and the relay K1 must be replaced for repair. This disconnection by short circuiting the input DC voltage by the relay K2 considerably increases the reliability of the disconnection apparatus. The reason for this is that very high currents can be switched on even by a relay K2 with low-cost relay contacts, since no arcing occurs during the connection process. It is thus possible to switch on currents which are many times greater than the currents which can be disconnected using comparable contacts. Furthermore, when the relay K2 activates, a situation is generally already present in which a high load current is flowing. Thus, by closing the relay K2 which is used as a short-circuiting relay, this means that only a small additional current flow through the relay K2 is required to cause the fuse S to blow.

The disconnection apparatus according to the invention has high availability, that is to say the apparatus itself provides high reliability against failure, since apart from the relay K1 which carries the majority of the load current to be disconnected in normal circumstances, there is an additional relay K2 for redundancy reasons. This is required only in emergencies, that is to say if the relay K1 fails, and is then, as stated above, not severely loaded during the disconnection process.

According to a further embodiment of the invention, the availability of the disconnection apparatus, that is to say its disconnection reliability, can be considerably further increased by a third relay K3 connected in series on the side of the load to be disconnected. The relay K3 brings about the disconnection process only when the relays K1 and K2 fail at the same time. In practice, it cannot be ruled out that the relay K2 is mechanically jammed as well or that the fuse S does not trip, for example due to a drop of an input DC voltage supplied from a battery. In this case, an additional relay K3 takes over the disconnection process. Since the relays K1 or K2 normally carry the majority of the current to be disconnected, the switching contact K31 of a third relay K3 is generally unloaded, and switches off without having to interrupt a current flow in the process. The relay K3 therefore has to switch a considerably smaller load than the relays K1 or K2, so that the wear to its contacts and thus its failure probability are considerably lower. The use of a third relay K3 thus results in highly reliable disconnection.

The disconnection apparatus according to the invention advantageously supplemented by the third relay K3 is thus distinguished by triple disconnection redundancy. Even in the event of failure of two load relays K1 and K2, disconnection is virtually always ensured by the lightly loaded third relay. Since different disconnection mechanisms are carried out by the relays K1, K2 and K3, this thus also increases the safety against design errors.

If the disconnection apparatus according to the invention also has a test circuit TS, then this allows the serviceability of all the relays to be tested before the disconnection apparatus is switched on again.

A precondition for the initiation of a connection process is that the switching contacts S1, S2 and S3 in the connecting lines K14, K24, K34 are open. Furthermore, the potential on the line L1 between the second and third relays K2 and K3 must be connected via a low impedance to 0 V, which can be detected via a test line Ps1. Finally, the requirement for connection in the form of an active control voltage Uf on the enable signal line must be satisfied.

The sequence of a connection process will be explained in more detail in the following text.

First of all, the switching contact S2 is closed by the test circuit TS. This causes activation of the relay K2 and opening of its switching contact K21. The test circuit now attempts via the test line Ps1 to confirm that the potential on the line L1 between the second and third relays K2 and K3 is no longer connected by low impedance to 0 V, but is high impedance. If this state does not occur after a certain time, then the connection process is interrupted and a fault is indicated. If the test point checked by test line Ps1 is for example at 24 V then the relay K1 is defective, and the connection process is likewise terminated.

If the potential on the line L1 between the second and third relays K2 and K3 is high impedance, the switching contact S1 is closed by the test circuit TS. This causes activation of the relay K1 and closure of its switching contact K11. This process is successfully completed when the test circuit detects the potential of the input DC voltage Ue via the test line Ps1 after a short time. Otherwise, the connection process is terminated since either the relay K1 or the relay K2 is then defective.

If the test circuit TS uses a further test line Ps2 to monitor the voltage at the connection point for the input voltage Ua of the electrical load, then any relay K3 which may additionally be present can also be tested. If the potential of the input DC voltage is also present on the test line Ps2, the relay K3 is defective and the connection process is terminated.

In the following step, the switching contact S1 is opened again. This step serves to carry out the actual connection process via the relay K1 and not via the relay K3. This ensures that the contacts of the relay K3 have the desired longer life than that of the relay K1.

The switching contact S3 is now closed and the relay K3 is thus switched on, that is to say its switching contacts K31 are closed. Finally, the switching contact S1 is closed, as a result of which the switching contact K11 in the relay K1 closes, and the load is supplied with current.

The termination of the connection process in one of the states described above results in the control signal Uf on the enable signal line FS being interrupted by the test circuit TS. This once again initiates a regular disconnection process, which corresponds to the disconnection process already described in detail above.

The test circuit TS is advantageously configured such that the disconnection and connection processes described above are carried out as a check at regular time intervals. Thus the serviceability of all the relays K1, K2, K3 can be tested regularly.

I claim:

1. In combination with a DC voltage supply supplying an input DC voltage, an apparatus for disconnecting an electrical load from the input DC voltage, comprising:

a potential-carrying first line;

a second line carrying a reference potential;

said first line having an input connection to be connected to the DC voltage supply and having an output connection to be connected to the electrical load;

said first and second lines carrying the input DC voltage from said input connection to said output connection;

a fuse connected in series in said first line and being provided adjacent to said input connection, said fuse having a side opposite said input connection;

a first relay having a first switching contact and having a side opposite said input connection;

said first switching contact being connected in series in said first line on said side of said fuse opposite said input connection, said first switching contact being closed during a normal operation, and said first switching contact being opened for disconnecting said first line when a disconnection is initiated;

a second relay having a second switching contact; and said second switching contact being connected in parallel between said first line and said second line on said side of said first switching contact opposite said input connection, said second switching contact being open during the normal operation, and being closed when the disconnection is initiated for short-circuiting said first line to said second line once said first switching contact is opened.

2. The apparatus according to claim 1, including:

a third relay having a third switching contact;

said second switching contact having a side opposite said input connection; and said third switching contact being connected in series in said first line on said side of said second switching contact opposite said input connection, said third switching contact being closed during the normal operation, and said third switching contact being opened when the disconnection is initiated for disconnecting said first line once said second switching contact is closed.

3. The apparatus according to claim 2, wherein said first, second, and third relays are commercially available relays each having a single contact set.

4. The apparatus according to claim 1, wherein said first and second relays are commercially available relays each having a single contact set.

5. The apparatus according to claim 1, wherein said second line carries a ground potential as the reference potential.

6. The apparatus according to claim 1, wherein said first and second relays perform a high-availability disconnection.

* * * * *